(12) United States Patent
Gabrys

(10) Patent No.: US 7,084,548 B1
(45) Date of Patent: Aug. 1, 2006

(54) LOW COST HIGH SPEED ELECTRICAL MACHINE

(76) Inventor: Christopher W. Gabrys, 1001 S. Meadows Pkwy. #1126, Reno, NV (US) 89521

( * ) Notice: Subject to any disclaimer, the term of this patent is extended or adjusted under 35 U.S.C. 154(b) by 0 days.

(21) Appl. No.: 10/889,532

(22) Filed: Jul. 12, 2004

Related U.S. Application Data

(60) Provisional application No. 60/486,776, filed on Jul. 11, 2003.

(51) Int. Cl.
*H02K 1/00* (2006.01)
(52) U.S. Cl. .................................. 310/268; 310/156.08
(58) Field of Classification Search .......... 310/156.08, 310/156.12, 156.26, 156.28, 156.29, 156.31, 310/267, 268, 208
See application file for complete search history.

(56) References Cited

U.S. PATENT DOCUMENTS

| | | | |
|---|---|---|---|
| 3,678,314 A * | 7/1972 | Carter | 310/268 |
| 4,371,801 A | 2/1983 | Richter | 310/156 |
| 4,551,645 A | 11/1985 | Takahashi et al. | 310/46 |
| 4,634,912 A * | 1/1987 | Heyraud | 310/268 |
| 4,644,202 A * | 2/1987 | Kroy et al. | 310/58 |
| 4,794,293 A * | 12/1988 | Fujisaki et al. | 310/268 |
| 5,097,140 A | 3/1992 | Crall | 290/36 |
| 5,498,919 A | 3/1996 | Bahn | 310/268 |
| 5,506,557 A * | 4/1996 | Sakaguchi et al. | 335/302 |
| 5,510,664 A | 4/1996 | Suzuki et al. | 310/268 |
| 5,619,087 A | 4/1997 | Sakai | 310/268 |
| 5,744,896 A | 4/1998 | Kessinger, Jr. | 310/268 |
| 5,910,697 A | 6/1999 | Sromin et al. | 310/254 |
| 5,945,766 A * | 8/1999 | Kim et al. | 310/268 |
| 5,962,942 A | 10/1999 | Pullen et al. | 310/156 |
| 5,982,074 A | 11/1999 | Smith et al. | 310/261 |
| 6,104,111 A | 8/2000 | Pullen et al. | 310/59 |
| 6,304,011 B1 | 10/2001 | Pullen et al. | 310/52 |
| 6,531,799 B1 * | 3/2003 | Miller | 310/114 |
| 6,568,065 B1 | 5/2003 | Graham et al. | 29/596 |
| 6,633,106 B1 | 10/2003 | Swett | 310/268 |
| 6,720,688 B1 * | 4/2004 | Schiller | 310/64 |
| 6,803,691 B1 * | 10/2004 | Rose | 310/156.32 |

* cited by examiner

*Primary Examiner*—Tran Nguyen
(74) *Attorney, Agent, or Firm*—J. Michael Neary

(57) ABSTRACT

A high speed brushless axial gap air core electrical machine includes a rotor mounted for rotation about an axis, and a stationary stator that magnetically interacts with the rotor. The rotor has two discs that are axially spaced apart to form an armature airgap. A stationary air core armature, with windings made of multiple individually insulated strand conductor wire for providing energy conversion, is located in the armature airgap. At least one of the discs carries a circumferential array of multiple alternating axial polarity permanent magnet poles facing the armature airgap. The magnets drive magnetic flux circumferentially through ferromagnetic portions of the discs and axially through the armature airgap. The discs have an integral axially extending circumferentially continuous lip outside of the array of magnet poles. The lip has a integral shear connection with the disc that substantially reduces the hoop stress in the lip that would otherwise occur from the radial containment of the magnet poles when rotated to high speed.

17 Claims, 9 Drawing Sheets

LOW COST HIGH SPEED ELECTRICAL MACHINE

This is related to U.S. Provisional Application No. 60/486,776 filed on Jul. 11, 2003.

This invention pertains to electrical machines for converting between electrical and mechanical energy and more importantly to a brushless, axial gap, air core electrical machine that provides exceptionally high power density with very low construction cost.

BACKGROUND OF THE INVENTION

There is a desire for low cost electrical machines for converting between electrical and mechanical energy that have both high efficiency and high performance capability. Unfortunately, current devices tend to suffer from one of more of a number of deficiencies that include low efficiency, low power density, and complex and expensive constructions.

Conventional permanent magnet radial gap motor/generators utilize a rotor with banded permanent magnets that is surrounded by a laminated stator. The rotor has a limited magnet peripheral speed and hence the power capability per amount of magnet and total weight is less than optimal. The magnets must also drive magnetic flux through a high-strength reinforcing band located in the magnetic airgap, which further reduces the power capability. The magnetic flux passing through a laminated stator incurs magnetic hysteresis and eddy current losses, which reduce efficiency.

Axial gap electrical machines can increase the magnet peripheral speed and power capability for a given weight and rotational speed because the magnets can be located at a larger diameter. This is at the expense of a larger diameter motor/generator rotor, which can be acceptable in many applications. Air core windings can also be utilized instead of slot windings to reduce magnetic losses. Unfortunately axial gap motor/generators encounter several problems, including complex construction, required subassembly machining, very high stresses, expensive and thick composite material reinforcement bands, low magnet strength issues, temperature limitations and high costs.

A prior art rotor for a brushless, axial gap, air core electrical machine is shown in FIG. 1A. The rotor 30 is comprised of a circumferential array of axially magnetized permanent magnets 31 that are connected to a central hub 32. The magnets are banded with a stainless steel band 33 having an optimized radial thickness to minimize the stress in the band 33. The stresses in the stainless steel band are shown in FIG. 1B. When rotating to a magnet peripheral speed of 265 m/sec, the radial stress remains low. However, the hoop stress far exceeds the allowable stress for the stainless steel band 33. The rotor speed must be substantially reduced for safety, reducing the power capability.

A second configuration prior art rotor for a brushless, axial gap, air core electrical machine is shown in FIG. 2A. The rotor 40 is comprised of a circumferential array of multiple axially magnetized permanent magnets 41 that are connected to a central hub 42. The magnets are reinforced or preloaded by an outer carbon fiber epoxy band 43 with radial thickness optimized to minimize stress. The stresses in the band 43 are shown in FIG. 2B. The radial stress remains low when rotated to the same 265 m/sec operating speed. However, the hoop stress is high, close to its allowable stress level. The design is therefore not very robust and desirable. Composite material bands typically suffer from low maximum temperature performance. If the rotor temperature becomes elevated, the strength will reduce and the rotor will no longer be able to safely operate at that speed. The composite band is expensive and also has a very low coefficient of thermal expansion, making the assembly process difficult. Furthermore, the large radial thickness of the composite band negatively imparts the electrical machine armature winding configuration and overall performance. A new type of axial gap brushless motor/generator that has improved performance as well as low cost and reliable construction is needed.

SUMMARY OF THE INVENTION

Accordingly, the invention provides a brushless, axial gap, air core electrical machine that achieves exceptionally high power density with very low construction cost. The electrical machine has a rotor that comprises two discs, each having ferromagnetic portions, that are axially spaced apart to form an armature airgap. A stationary air core armature is located in the armature airgap with windings for providing power conversion. At least one of the two rotor discs comprises a circumferential array of multiple alternating axial polarity permanent magnet poles facing the armature airgap. The permanent magnet poles drive magnetic flux circumferentially through the ferromagnetic portions and axially through the armature airgap. The discs also comprise an integral axially extending circumferentially continuous lip outside of the permanent magnet poles that radially contains the poles. The lip has an integral shear connection with the disc that substantially reduces the hoop stress in the lip that would otherwise occur from the containment of the permanent magnet poles when rotated to high speed.

Unlike conventional outer band reinforcement methods, the use of a shear lip connection to the disc can provide a substantial reduction in the hoop stress in the band containing the magnets. The connection essentially converts hoop stress into both hoop and radial stresses that are more closely equal and with a lower maximum value. In a preferred embodiment, the maximum radial stress in the lip is converted from a negative value as in an isolated outer band to a value equal to or greater than 30% of the maximum hoop stress value in the lip. Secondly, the hoop stress can be further reduced by the distribution of one half of the axial thickness magnets on two rotors instead of just one rotor carrying the magnets. Two rotors can therefore share the centrifugal loading instead.

Use of such a shear lip for magnet containment has several potential deficiencies. Because the shear lip is constructed from metal such as steel, hysteresis and eddy current losses in the lip could be very high especially from high-speed operation. The electrical conductivity of steel is also roughly five times higher than that of rare earth permanent magnets, which could make the problem worse. Secondly, the lip also provides a path for magnetic flux leakage around magnets on a single rotor disk from the armature airgap side directly to the lip. This would be considered to reduce the potential power capability and efficiency of such a construction.

However, it has been found that the use of an integral lip reduces the hoop stress in the outer band so significantly that the lip can usually be made very small radially, several times smaller than separate bands used in prior art electrical machines. The smaller radial thickness reduces the amount of flux leakage to a small amount and most of the magnet flux traverses the armature airgap for power conversion. The small radial lip thickness also limits the magnetic losses. It has also been found that the relatively large armature airgap in slotless air core motor/generator construction of machines in accordance with one aspect of the invention further substantially reduces any armature induced magnetic losses in the lip. The flux from the permanent magnets overcomes the armature reactance. An additional substantial benefit of using the shear lip is that the stiffness of the lip is much higher than even carbon fiber bands because of its connection to the disc. The hoop strain imparted to the magnets can be reduced by a factor of three or more in many cases. This reduced strain greatly reduces the tendency for magnet failure during high-speed operation.

In a preferred embodiment, the stress in the rotor is reduced by the discs having a web portion axially adjacent the permanent magnet poles that has an axial thickness equal to or greater than the axial thickness of the lip. This reduces the stress imparted in the outer portion of the disc. For very high speed rotation, greater than 100 m/sec, the discs are preferably made solid without a through hole in the center. This makes the shaft attachment to the discs for journaling significantly more difficult. However, the solid center reduces the disc center hoop stress by more than a factor of two and can increase the rotational speed capability by more than 40%.

The shear lip can also allow for much easier rotor assembly because the outer lip or band is already integrally connected to the disk or hub. The magnets can be simply magnetically stuck to the rotor or bonded if desired. The dimensional tolerances of the magnets can also be made much easier and subassembly machining can be eliminated. Several constructions are described that each have different advantages.

Beyond containment of the magnets against centrifugal loading, prevention of actual magnet failure can be accomplished by several means. In one embodiment, the circumferential length of individual magnets is limited by using a high number of poles, such as greater than 9. Reduced magnet arc length, reduces the bending stresses in low strength magnets. An additional benefit of a higher pole number is a reduction in the web thickness of ferromagnetic material required for efficiently circumferentially conducting magnetic flux between circumferentially adjacent poles.

In another embodiment, the lip has features for locating the placement of the permanent magnet poles to allow for uniform and circumferentially accurate placement as well as holding the magnets circumferentially in place during operation. One method is employing flat radially outward magnet surfaces that mate with flat portions in the inner diameter of the shear lip, which reduces magnet stresses. This eliminates the problems of accurately matching the curvature of the magnet piece outer diameter with the inner diameter of the lip. Even a slight mismatch causes the support to become a point load and dramatically increase the magnet stress. However, flat surfaces reliably and accurately fit together for assurance of a uniform distributed magnet support. The flats also provide for improved torque transfer.

In some instances, it is desirable to limit the electrical frequency for a given rotational frequency. This can be done for several reasons, including reducing the electronics frequency for motor drives and providing a desired output frequency for a generator. In one embodiment, the alternation of the polarity of the permanent magnet poles is made less than every magnet. In this way, the magnet circumferential length can be made small but the electrical frequency can also be reduced. An additional benefit of reducing the number of pole alternations around the circumference is a reduction in the magnetic flux leakage between alternating poles on a disc. Such leakage would not jump the armature airgap and hence would be ineffective.

For very high speed and high power density applications, precompression of the magnets can be required to prevent failure or to insure maintenance of a high balance tolerance. In this case, the magnets are interference fit inside the lip. Unlike conventional bands of other motor/generators, the shear connection for the lip to the disc provides the very high stiffness of the disc to be transferred to the lip. The radially thin lip therefore can effectively precompress the magnets for stress reduction at high speeds. Interference assembly can be done be thermal shrink fitting or alternatively by press fitting.

In one embodiment, the circumferential array of permanent magnet poles comprises a single multi-pole ring magnet. The outer diameter of the magnet is tapered and the inner diameter of the lip has a matching taper. The magnet is then axially press fit inside the lip for interference assembly.

When multiple individual magnets are utilized, they could be bonded together and ground with a taper on the outer diameter. However, this can add significant cost. In yet another embodiment, the magnets are assembled and bonded together inside a liner ring. The liner ring has an outer diameter taper and is then press fit inside the lip. Machining tolerances and cost of the magnets can be significantly reduced with this method. The liner ring can be made from different materials however materials with a low hoop elastic modulus such as aluminum or fiber glass are preferred because they reduce the total loading required on the lip.

For maximum power capability with the invention, preferably both rotor discs have circumferential magnet arrays. It has been found that placement of magnets on both rotors can yield a significant increase (up to 60% or more) in the magnetic flux density in the armature airgap over placement of the same amount of magnet material on just one rotor disc.

A further benefit of the invention arises from the radially reduced outer band thickness, which allows for further increased performance.

The air core armature can be made by several different methods. However, in yet another preferred embodiment, the armature is wound using multiple individually insulated strand conductor or Litz wire. The Litz wire reduces eddy current losses that would occur in the actual windings. The windings can be further wound such that the active lengths traverse radially in the armature airgap and the end turns traverse circumferentially outside of the armature airgap. Overlapping the end turns is also avoids increasing the active length axial thickness through the winding technique. The axial thickness of the end turns is higher than the axial thickness of the active lengths so the outer end turns must have a diameter greater than the rotor. By this method, the active lengths can be wound to a higher density and more windings, typically twice as many, can be utilized for even higher power capability for a give size and cost electrical machine. Previous air core electrical machines have used spiral windings. Such windings allow for low resistance because of the short lengths however they include the end turns in the armature airgap and hence achieve much less than optimal performance. Because the radial thickness of the shear lip, made possible in the machines disclosed herein, can be made much smaller than conventional banded axial gap electrical machines, the length of the radial traversing active lengths need not be exceedingly long to overcome the radial thickness of an outer band. As such, much higher winding density armature construction can be used while still having a low resistance for high efficiency.

DESCRIPTION OF THE PREFERRED EMBODIMENT

Figure 1A:
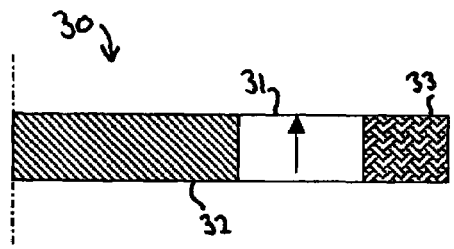
FIG. 1A is a schematic drawing of a portion of a prior art rotor for a brushless, axial gap, air core electrical machine.
Figure 1B:
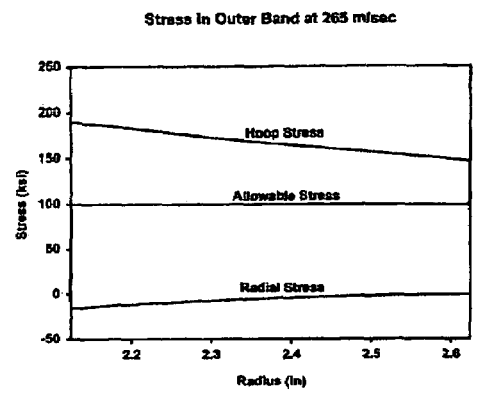
FIG. 1B is a graph showing hoop stress distribution in the outer reinforcement band of the rotor in FIG. 1A.
Figure 2A:
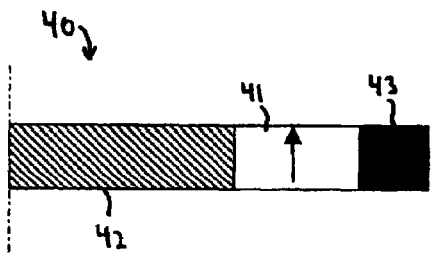
FIG. 2A is a schematic drawing of a portion of a second configuration prior art rotor for a brushless, axial gap, air core electrical machine.
Figure 2B:
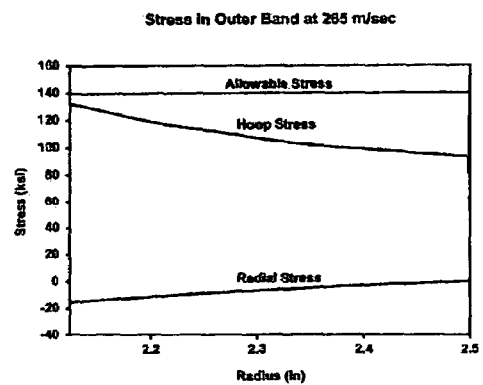
FIG. 2B is a graph showing hoop stress distribution in the outer reinforcement band of the rotor in FIG. 2A.
Figure 3A:
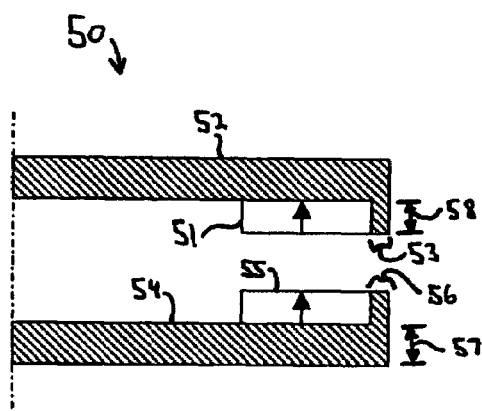
FIG. 3A is a schematic drawing of a rotor for a brushless, axial gap, air core electrical machine in accordance with the invention.
Figure 3B:
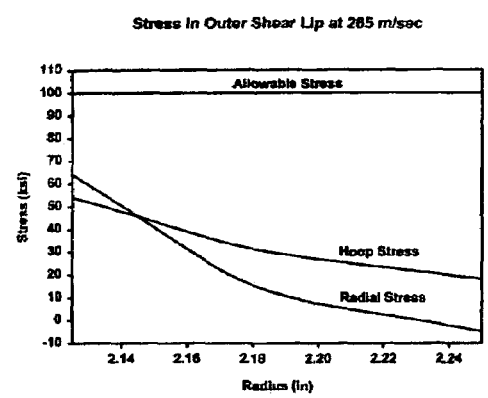
FIG. 3B is a graph showing hoop stress distribution in the outer reinforcement lip of the rotor in FIG. 3A in accordance with the invention.

Turning to the drawings, wherein like reference characters designate identical or corresponding parts, a rotor 50 shown in FIG. 3A includes a circumferential array of alternating axial polarity permanent magnet poles 51 attached to a rotor disc 52 that has a shear lip 53 for containment of the magnet poles 51. The rotor 52 is preferably constructed from metal such as steel so that it possesses a high shear strength. The rotor 52 could be constructed from nonferrous metal, however ferromagnetic material would need to be placed axially behind the permanent magnets for circumferential conduction of the magnetic flux. The stresses in the lip 53 are shown in FIG. 3B. Unlike prior art band constructions, the radial stress is high and the hoop stress is simultaneously lowered. Both stresses are well below the allowable stress even when the rotor is rotated to a magnet peripheral speed of 265 m/sec. The steel rotor construction is also more durable and insensitive to temperature, unlike carbon fiber epoxy composite reinforcement bands.

The stress in the reinforcement lip 53 is reduced because of its integral connection to the disc 52 that increases radial stress and reduces the hoop stress to preferably comparable values for the highest operating speed. Placing one half-thickness magnet on two rotors instead of full thickness magnets on just one rotor also facilitates higher speed operation. This distributes the centrifugal loading for higher speed and power capability. Accordingly, the second steel rotor 54 is located opposite the first steel rotor 52 and has a magnet array 55 similarly contained by an outer lip 56. To reduce the stresses imparted to the discs 52, 54, the web thickness 57 is preferably equal to or greater than the lip axial thickness 58. To further reduce the stress in the connection between the lip 53 and disc 52, the inner corner preferably utilizes an appropriate sized radius. The magnet 51 may then accordingly require a chamfered corner to allow it to radially seat against the inner diameter of the lip 53.

Figure 4:
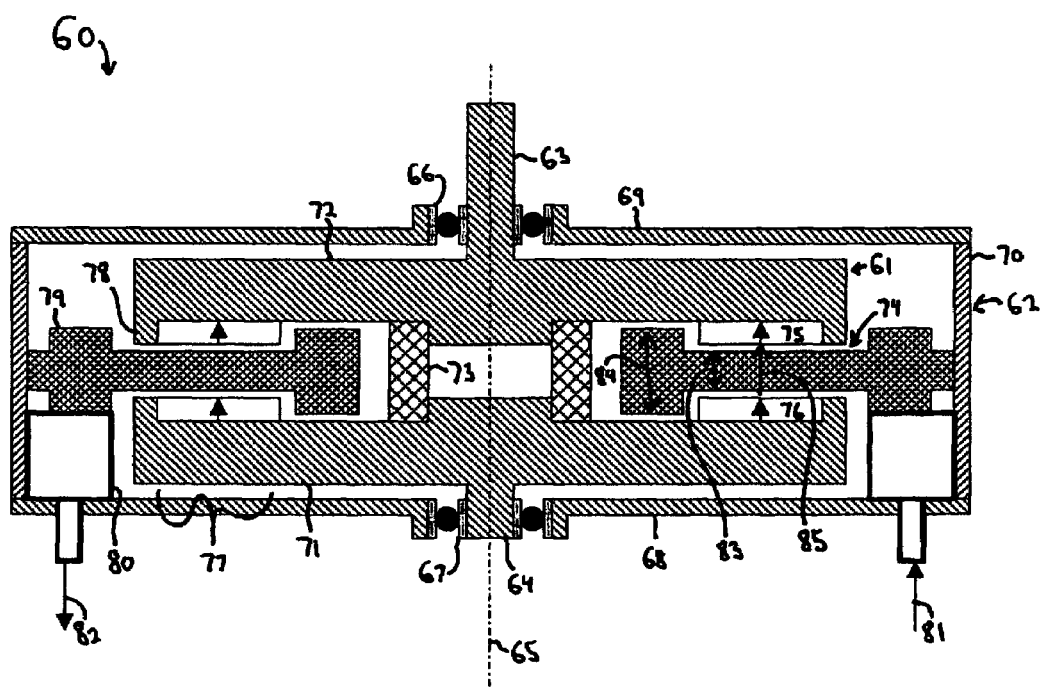
FIG. 4 is a schematic drawing of a brushless, axial gap, air core electrical machine in accordance with the invention.

A brushless, axial gap, air core motor/generator 60, shown in FIG. 4, includes a rotor 61 and a stator 62. The rotor 61 has shafts 63, 64, which can be made integral for the highest speed capability. The shafts 63, 64 are journalled in bearings 66, 67, which are supported by housing end plates 69, 68, respectively. The end plates 68, 69 are axially separated and coupled by an outer housing tube 70. The rotor 61 is comprised of two discs 71, 72 that have ferromagnetic portions 77. In this case, the rotor discs 71, 72 are constructed of steel so they are a ferromagnetic. The rotor discs 71, 72 contain circumferential arrays of multiple alternating axial polarity permanent magnet poles 76, 75 that drive flux 85 across an armature airgap 74 between the discs 71, 72. The magnetic poles 75, 76 are contained by outer axial extending integral lips 78 that are integral with the discs 71, 72. The rotor discs may be connected together by different methods that provide a reliable and strong connection, including interference fits, bolts, etc. The discs 71, 72 may also be hollow and be connected to separate central shaft. As shown, an inner stainless steel tube 73 is interference fit between the discs 71, 72. A simpler method may also to halve a recess on one disc and a protrusion on the other such that the two discs are assembled together with each other.

An air core armature 79 is located axially between the two discs 71, 72 inside the armature airgap 74. The air core armature 79 comprises windings for conversion of power. The air core armature can be constructed by various methods so long as the armature is substantially nonmagnetic in the region of the armature airgap 74. In a preferred configuration, increasing the winding density in the armature airgap 74 can increase power density and efficiency. The armature 79 is preferably wound with radial active lengths in the armature air gap 74 and end turns outside the armature airgap 74 such that the end turn axial thickness 84 is greater than the active length thickness 83. This construction can provide the highest winding density and hence highest performance per electrical machine size, weight and cost. Cooling of the air core armature can be more difficult than in conventional slot wound electrical machines because of the lack of thermal conduction with a steel stator. However, the absence of a ferromagnetic stator reduces magnetic losses by 3–4% or more, and hence less heat needs to be removed. Convection cooling with holes (not shown) in the rotor discs 71, 72 can be used as well as conduction from the armature 79 to the outer housing 70. Liquid cooling can also be used either by direct immersion of the air core armature 79 or through a cooling chamber 80 in contact with the armature 79. Liquid coolant is pumped through the chamber 80 in the entrance port 81 and exiting the exit port 82.

Figure 5:
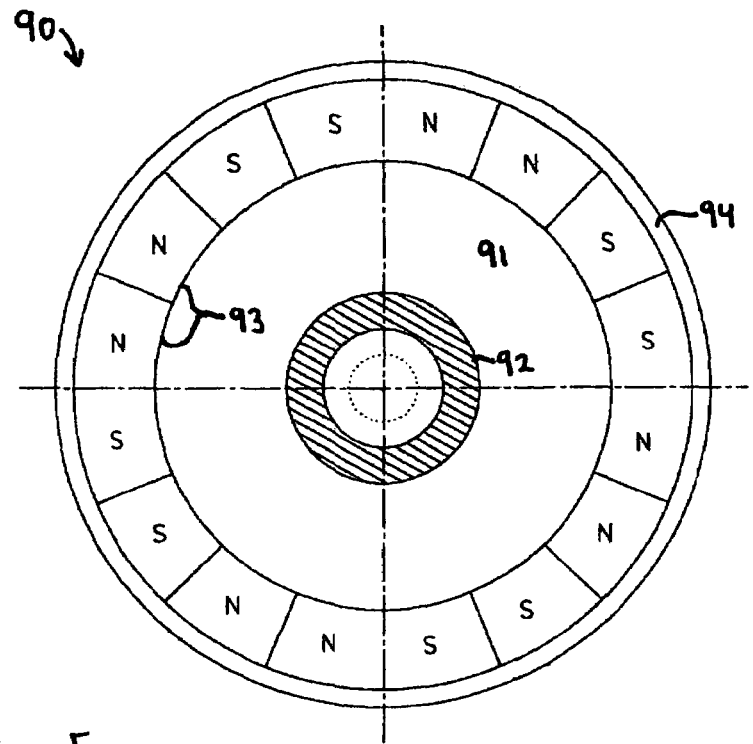
FIG. 5 is a schematic drawing of a rotor for a brushless, axial gap, air core electrical machine in accordance with the invention.

Beyond the containment of the magnets at high speed by the lip, magnet failure is also preferably prevented. One method to prevent magnet failure is to reduce the circumferential length of the magnets by utilizing a high number of poles or magnets, such as greater than 9 and preferably greater than 15 for some applications. A rotor for a brushless, axial gap, air core electrical machine in accordance with this aspect of the invention is shown in FIG. 5. The rotor 90 has a ferromagnetic disc 91 with integral outer lip 94. A circumferential array of multiple alternating axial polarity permanent magnets 93 is contained inside the lip 94. A center connection tube 92 provides for connection to a second disc, not shown. The rotor 90 could be used in the machine 60 shown in FIG. 4, as well as other such electrical machines.

Figure 6:
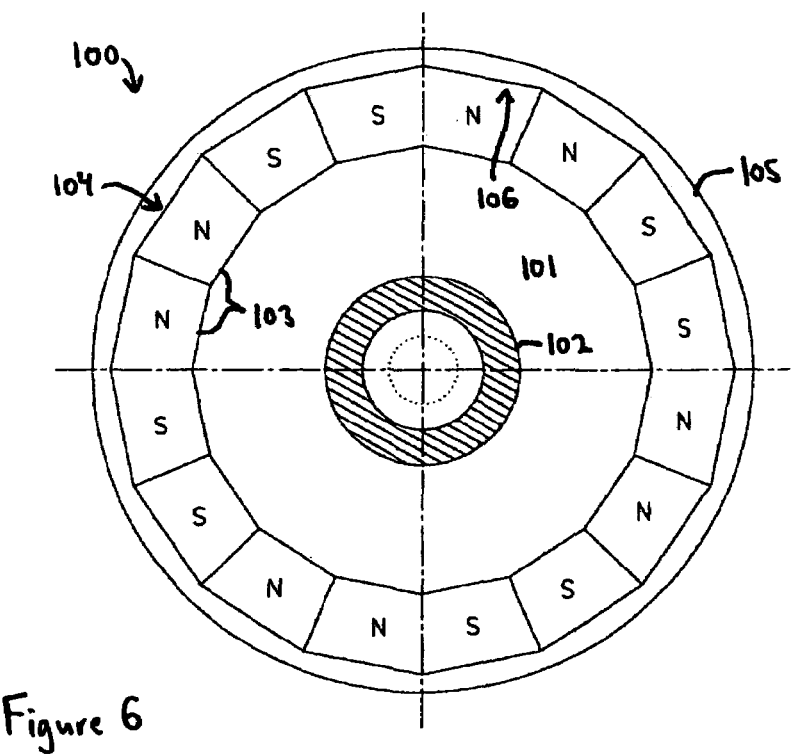
FIG. 6 is a schematic drawing of an alternate configuration rotor for a brushless, axial gap, air core electrical machine in accordance with the invention.

In some cases, it is desirable to limit the electrical frequency for a given rotational frequency. This can reduce the required motor drive electronics bandwidth for motor applications or provide lower frequency power for generator applications. In one embodiment, the magnets 93 alternate polarity at a frequency of less than every magnet, such as every third magnet as shown in FIGS. 5 and 6. This allows the electrical frequency to be reduced while still maintaining a limited circumferential magnet length. Reduced circumferential length can also facilitate easier fabrication for very large diameter electrical machines. The drawback of using a lower number of actual poles is a required increase in the rotor disc thickness to accommodate an increased circumferential flux between poles.

In another embodiment shown in FIG. 6, using flat-sided magnets can further reduce the stresses in the magnets and/or allow for accurately distributed placement. The alternate configuration rotor 100, shown in FIG. 6, is comprised of a steel disc 101 with an integral axially extending outer lip 105. A circumferential array of alternating axial polarity permanent magnets 103 is contained inside the lip 105. A center tube 102 is used for connection to a second disc, not shown, similar to the arrangement shown in FIG. 4. Producing magnets with a high dimensional tolerance is usually difficult and costly. Therefore magnets with an outer diameter radius will invariably not perfectly match the inner diameter radius of a shear lip for containment. The result is less than uniform distributed magnet support and point-loading support can cause an increase in the magnet stress by as much as a factor of six or more. To overcome this problem, the radially outward surfaces of the magnets 103 can be made with flat portions 104. The inner diameter of the lip 105 also has mating flat portions 106 for magnet placement. The flat surfaces provide for reliable and more uniform magnet support for rotation to higher speeds. The flats can also help increase torque transfer. Other methods of lip features for locating the placement of the permanent magnet poles could also be used such as curved recesses in the lip to match circular or curved magnets. Providing magnets with a radius of curvature that is slightly less than the radius of curvature of the lip can also be done to more uniformly support the magnets when at high speed for lower magnet stresses.

Figure 7:
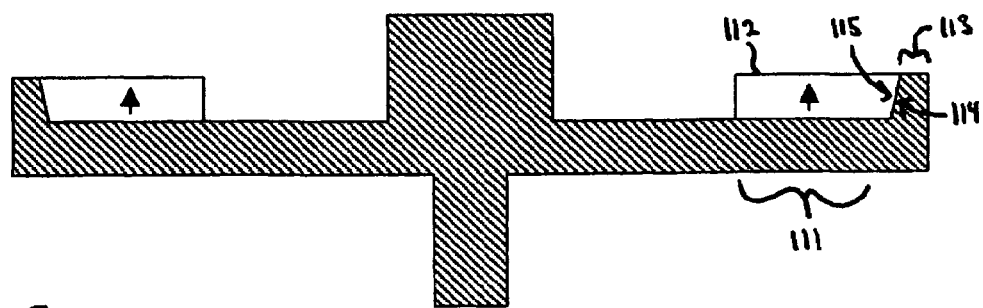
FIG. 7 is a schematic drawing of a second alternate configuration rotor for a brushless, axial gap, air core electrical machine in accordance with the invention.

For very high speed applications, precompression of the magnet array can be desirable. Unlike use of separate isolated reinforcing bands of other electrical machines, the shear connection of the radially thin lip to the large disc provides for very high stiffness with use of steel. The circumferential magnet pole array is interference fit inside the lip to drive it into compression and reduce tensile stresses when rotated to high speed. The interference fit can be accomplished by thermal shrink fitting, due to the high coefficient of thermal expansion of metals, or alternatively by press fitting. These features are illustrated in a second alternate configuration rotor 110, shown in FIG. 7, having a steel disc 111 with integral outer lip 113. A circumferential array of permanent magnet poles 112 is radially contained inside the lip 113. The lip 113 has a tapered inner diameter 113 and the outer diameter 114 of the magnet array 112 is also tapered to facilitate press fitting for radial precompression of the magnet array 112. The magnet array can be multiple pieces of magnets, multiple magnets bonded together and then ground with a taper or alternatively a single ring multiple-pole magnet.

Figure 8:
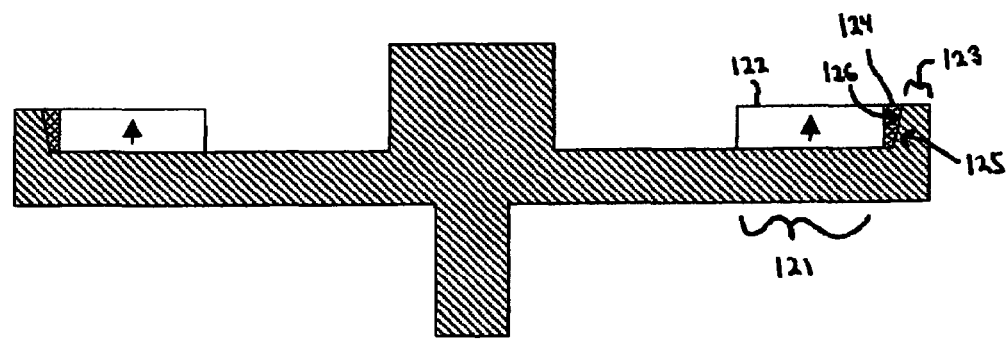
FIG. 8 is a schematic drawing of a third alternate configuration rotor for a brushless, axial gap, air core electrical machine in accordance with the invention.

When multiple piece magnets are used such as sintered NdFeB magnets, high tolerances for interference fitting are difficult to achieve and costly. In another embodiment of the invention, the magnets can be interference fit with the use of a liner ring, as illustrated in the alternate configuration rotor 120 shown in FIG. 8. The rotor 120 is comprised of a steel disc 121 that has an integral outer axially extending lip 123. A circumferential magnet array 122 is contained and precompressed inside the lip 123. The magnets, which can have easy dimensional tolerances are assembled and bonded inside a liner ring 124 prior to assembly in the rotor 120. The liner ring 124 has an outer diameter taper 125 and the lip 123 has an inner diameter taper 126. The magnets 122 and liner ring 124 are press fit into the lip 123 for precompression. The liner ring 124 can be made from various materials including metals and plastics however materials with a low hoop elastic modulus, such as aluminum and fiberglass, are preferred because they reduce the loading on the lip 123 from precompression of the magnets 122. Non-conductor materials also reduce generation of eddy current losses.

Figure 9:
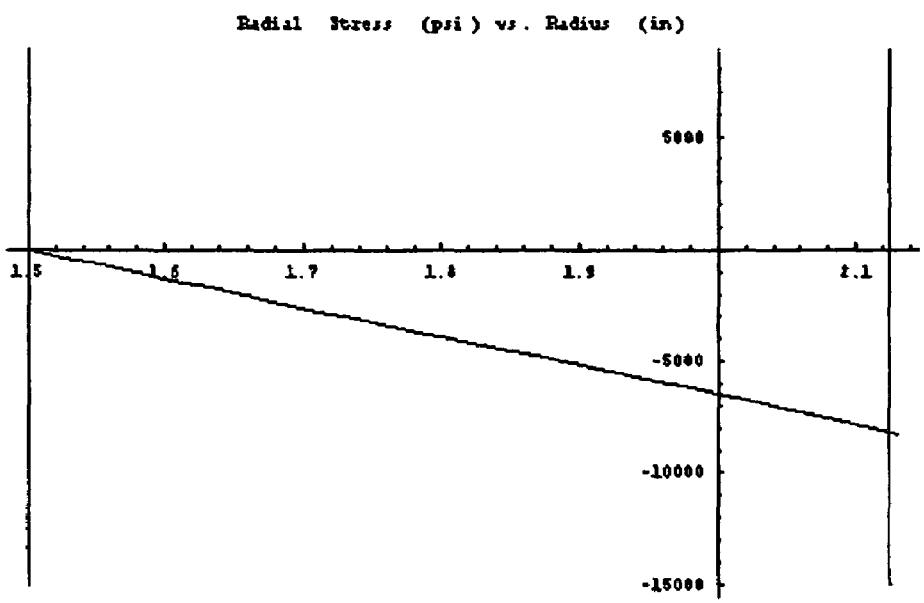
FIG. 9 is a graph showing radial stress distribution in a permanent magnet array from precompression and high-speed rotation in accordance with the invention.
Figure 10:
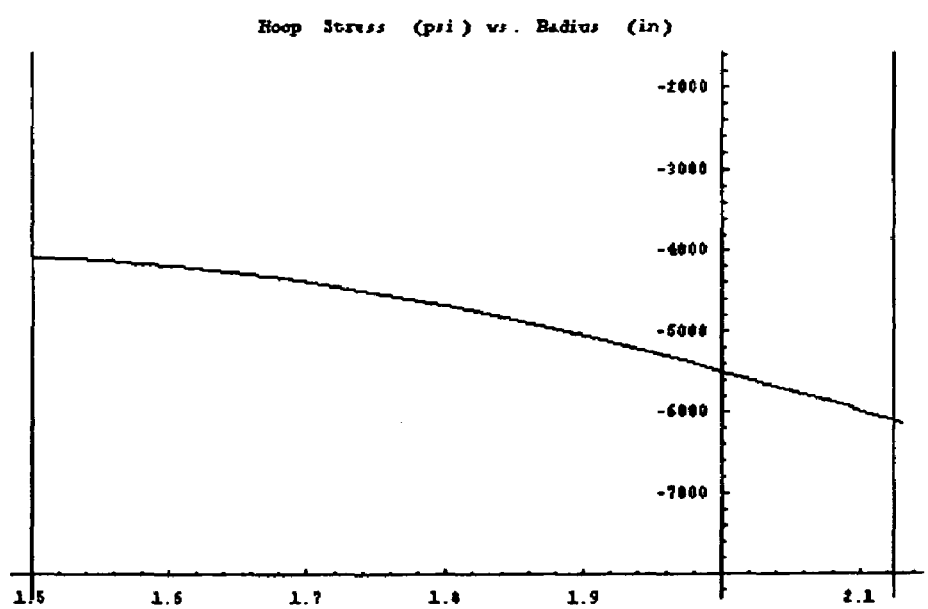
FIG. 10 is a graph showing hoop stress distribution in a permanent magnet array from precompression and high-speed rotation in accordance with the invention.

The radial and hoop stress distributions in a permanent magnet array from precompression and high-speed rotation are shown in FIGS. 9 and 10. The radial stress is driven into compression from the outer pressure. The hoop stress level can be in complete compression, as shown, or can be only a reduced level of tension throughout. It is preferable to drive the magnets into complete compression for highest magnet speeds due to the very low tensile strength of magnets, typically around 10 ksi. However, complete compression may cause the lip stress to become too high for some designs and in this case some low tension in the magnets can be tolerated.

Figure 11:
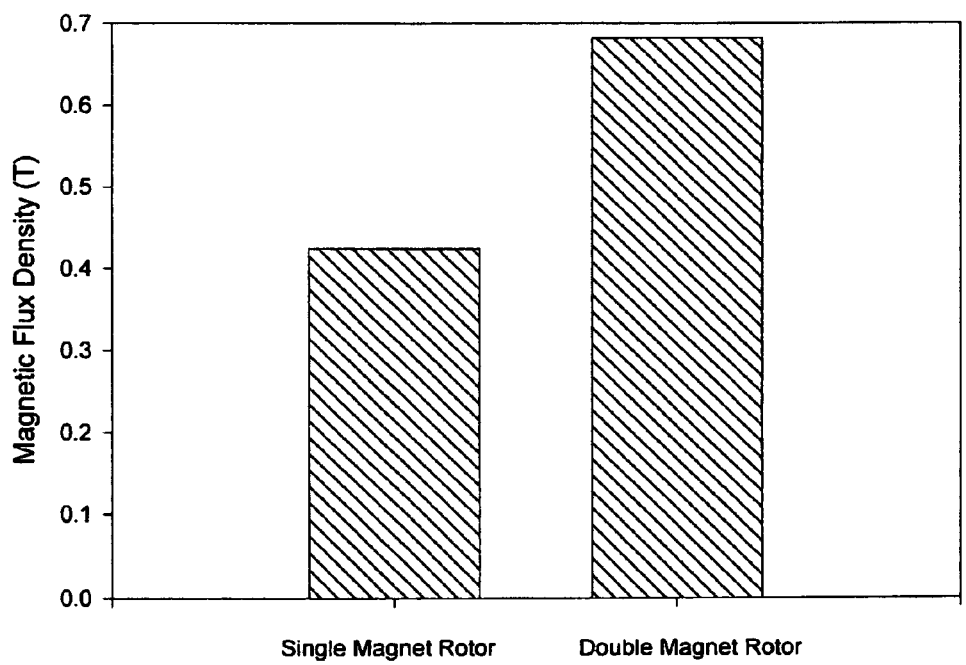
FIG. 11 is a bar chart showing a comparison of magnetic flux density between single and double magnet rotors.

Although the electrical machine can utilize a circumferential array of permanent magnet poles on just one rotor disc, addition of permanent magnets to both rotor discs has been found to allow significantly increased performance. A comparison of magnetic flux density between single and double magnet rotors is shown in FIG. 11. For an equivalent amount of permanent magnet material, utilizing one half-thickness magnets on each rotor can provide up to a 60% or higher increase in armature flux density over full thickness magnets on a single rotor. More flux can be made to traverse axially across the armature airgap and less leakage occurs between circumferentially adjacent magnets, depending on the actual design parameters. The increased flux density translates directly into increased power capability and efficiency for a given electrical machine.

Figure 12A:
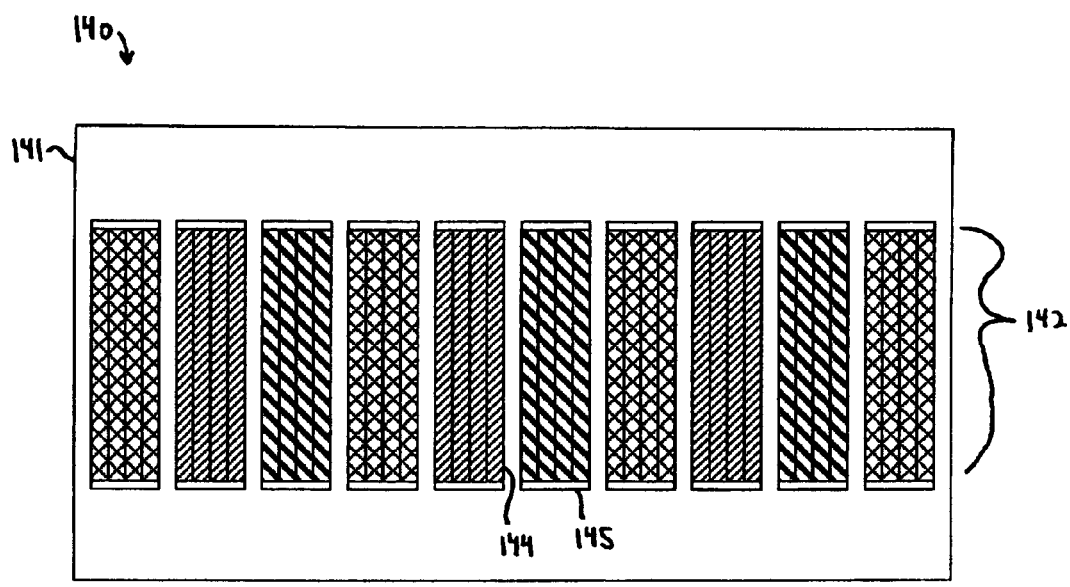
FIG. 12A is a circumferential section of air core armature windings layout (one side).
Figure 12B:
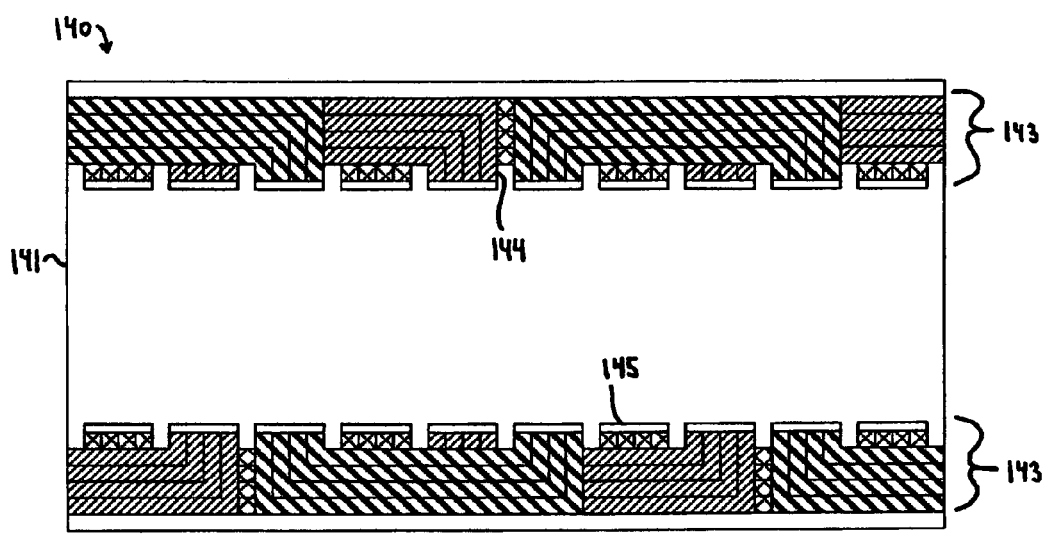
FIG. 12B is a circumferential section of air core armature windings layout (opposite side).

Although air core armatures can be constructed by various means, including spiral winding, helical winding, separately winding coils and bonding them together, winding on armature tooling or winding on to a form, one preferred method maximizes the winding density in the armature airgap. Opposite axial sides of a circumferential section of air core armature windings layout in accordance with the invention are shown in FIGS. 12A and 12B. The armature 140 is comprised of a fiberglass form 141 and multiple windings 144 that are wound on to and bonded to the form 141. The windings are preferably wound with multiple individually insulated strand conductor wire or Litz wire in order to minimize eddy current losses that would otherwise occur in the actual windings in the armature airgap. The enamel on the individual strands of the wire prevents electrical eddy currents circulating across the whole wire when subjected to the changing magnetic field as the rotor rotates. The windings 144 have active lengths 142 that traverse radially and are located in the armature airgap and end turns 143 that traverse circumferentially and are located outside the armature airgap. The preferred armature construction maximizes the winding density in the active region for increasing the power capability and efficiency. This is preferably accomplished winding such that the end turns also have an axial thickness that is greater than the axial thickness of the active lengths. As shown, the form winding uses slots 145 in the form. The windings pass through the slots 145 when traversing between active lengths 142 and end turns 143. The end turns 143 are located on the opposite side of the form 141 as the active lengths 142 and hence overlapping of the end turns 143 does not needlessly increase the required airgap thickness for a given amount of active length windings. Winding density with this construction can be as much as twice as high or higher than other constructions, allowing for twice the power capability for a given motor/generator. Other methods can also be used to achieve the same high-density active region with radial conductors and axially thicker end turns. Use of tooling can be done to eliminate the form thickness in the armature airgap but with the deficiency of more difficult mounting to the stator. Although high density winding with increased end turn thickness forces the end turns to be located outside of the armature airgap with potentially increased radial and circumferential length and resistance, it can be implemented with the small radial rotor lip thickness of the invention to achieve substantially increased performance.

Figure 13A:
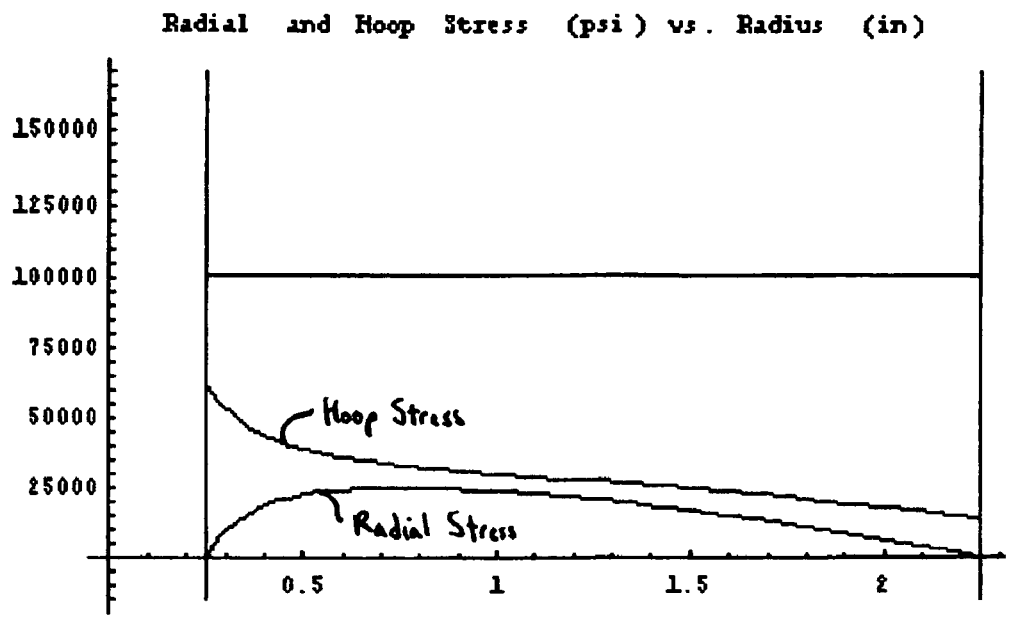
FIG. 13A is a graph showing radial and hoop stresses in a steel disc with a central hole rotating at 265 m/sec.
Figure 13B:
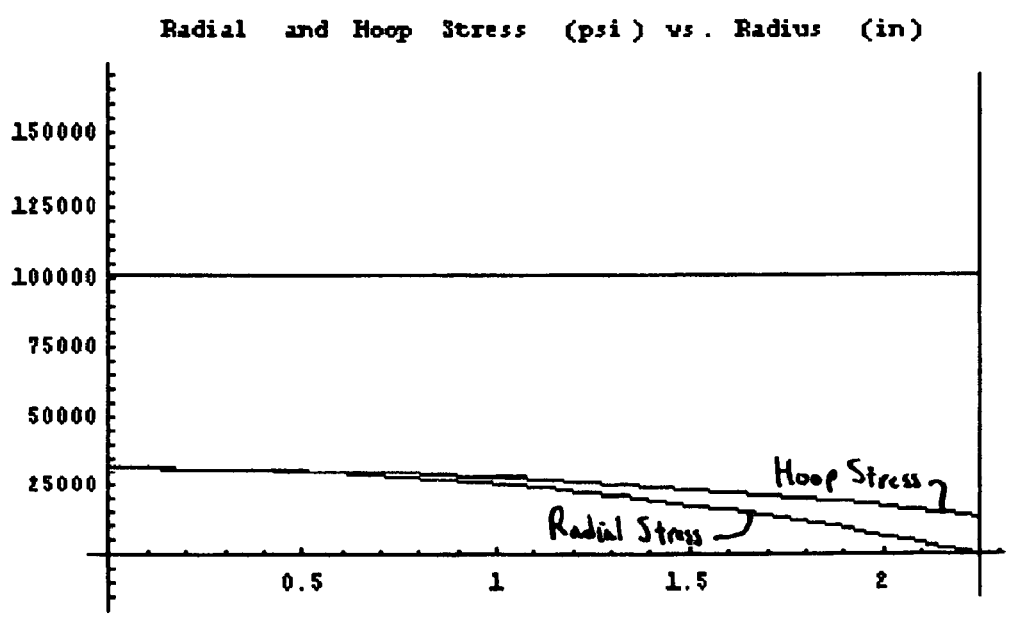
FIG. 13B is a graph showing radial and hoop stresses in a steel disc without a central hole rotating at 265 m/sec.

The radial and hoop stress distributions for a steel disc rotor with and without a central hole are shown in FIGS. 13A and 13B, when rotated to a high speed of 265 m/sec peripheral speed. The addition of a central hole in disc type motors is common to allow for easy attachment of a separately formed shaft. However, as shown in FIG. 13A, the hoop stress becomes very high at the inner diameter of the disc when rotated to high speed if it has a central shaft hole. The interference of a shaft in the hole will only raise the hoop stress even higher. In FIG. 13B, the hoop and radial stresses are both shown to be low and equal in the center. The solid center does make shaft attachment more difficult and can require the shafts to be machined with the discs form a single piece, adding cost. However, the rotor stress is reduced by more than a factor of two and can be rotated at least 40% faster.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims:

I claim:

1. A high speed brushless axial gap air core electrical machine for converting between electrical and mechanical energy comprising:
    a rotor mounted for rotation about an axis of rotation, and a stator that is stationary and magnetically interacts with said rotor;
    said rotor comprising two discs, each having a solid center, free of a through hole, and made substantially entirely of steel, said discs are axially spaced apart to form an armature airgap;
    a stationary air core armature located in said armature airgap with windings for providing energy conversion;
    at least one of said discs comprising a circumferential array of multiple alternating axial polarity permanent magnet poles facing said armature airgap that drive magnetic flux circumferentially through said ferromagnetic portions and axially through said armature airgap;
    said discs further comprising an integral axially extending circumferentially continuous lip outside of said circumferential array of multiple alternating axial polarity permanent magnet poles, said lip having a integral shear connection with said disc that substantially reduces the hoop stress in said lip that would otherwise occur from the radial containment of said circumferential array of multiple alternating axial polarity permanent magnet poles when rotated to high speed.

2. A brushless electrical machine as described in claim 1 wherein:
    said lip being made of a steel that, during operation of said machine, has a maximum radial stress equal to or greater than 30% of maximum hoop stress in said lip.

3. A brushless electrical machine as described in claim 1 wherein:
    said permanent magnet poles individually have circumferential lengths that are limited by having more than 9 poles around the circumference.

4. A brushless electrical machine as described in claim 1 wherein:
    said lip has features for locating the placement of said permanent magnet poles.

5. A brushless electrical machine as described in claim 4 wherein:
    said individual permanent magnet pieces have radially outward surfaces that are substantially flat and the inner diameter of said lip has mating flat portions for placement of said individual permanent magnet pieces.

6. A brushless electrical machine as described in claim 1 wherein:
    said permanent magnet poles are formed from individual permanent magnet pieces, and the frequency of alternation of the axial polarity of said permanent magnet pieces is less than every permanent magnet piece.

7. A high speed brushless axial gap air core electrical machine for converting between electrical and mechanical energy comprising:
    a rotor that rotates about an axis of rotation and a stator that is stationary and magnetically acts upon said rotor;
    said rotor comprising two steel discs which are axially spaced apart to form an armature airgap, each of said discs having a solid center without a through hole;
    a stationary air core armature located in said armature airgap with windings for providing energy conversion;
    said windings of said air core armature comprise multiple individually insulated said conductor wire;
    at least one of two said discs comprising a circumferential array of multiple alternating axial polarity permanent magnet poles facing said armature airgap that drive magnetic flux circumferentially through said ferromagnetic portions and axially through said armature airgap;

said discs further comprising an integral axially extending circumferentially continuous lip outside of said circumferential array of multiple alternating axial polarity permanent magnet poles that radially supports said circumferential array of multiple alternating axial polarity permanent magnet poles when rotated to high speed;

said permanent magnet poles are held to said rotor axially by magnetic attraction to said ferromagnetic portions.

8. A brushless electrical machine as described in claim 7 wherein:

said lip and said discs are constructed substantially of steel having sufficient strength to support said permanent magnet poles to rotate with a peripheral speed equal to or greater than 100 m/sec.

9. A brushless electrical machine as described in claim 7 wherein:

both of said discs comprise circumferential arrays of multiple alternating axial polarity permanent magnet poles facing said armature airgap.

10. A brushless electrical machine as described in claim 7 wherein:

said permanent magnet poles individually have circumferential lengths that are limited by having more than 9 poles around the circumference.

11. A brushless electrical machine as described in claim 7 wherein:

said lip has features for locating the placement of said permanent magnet poles.

12. A brushless electrical machine as described in claim 8 wherein:

said permanent magnet poles are formed from individual permanent magnet pieces, and the frequency of alternation of the axial polarity of said permanent magnet pieces is less than every permanent magnet piece.

13. A high speed brushless axial gap air core electrical machine for converting between electrical and mechanical energy comprising:

a rotor that rotates about an axis of rotation and a stator that is stationary and magnetically acts upon said rotor;

said rotor comprising of two discs, each having ferromagnetic portions and a solid center without a through hole, said discs being axially spaced apart to form an armature airgap;

a stationary air core armature located in said armature airgap with windings for providing energy conversion;

said windings of said air core armature comprise multiple individually insulated strand conductor wire;

at least one of said discs comprising a circumferential array of multiple alternating axial polarity permanent magnet poles facing said armature airgap that drive magnetic flux circumferentially through said ferromagnetic portions and axially through said armature airgap;

said discs further comprising an integral axially extending circumferentially continuous lip outside of said circumferential array of multiple alternating axial polarity permanent magnet poles that radially support said circumferential array of multiple alternating axial polarity permanent magnet poles when rotated to high speed;

said discs having a web portion axially adjacent said permanent magnet poles that has an axial thickness equal to or greater than the axial thickness of said lip.

14. A brushless electrical machine as described in claim 13 wherein:

said lip and said discs are constructed substantially entirely of steel having sufficient strength to support said permanent magnet poles to rotate with a peripheral speed equal to or greater than 100 m/sec.

15. A brushless electrical machine as described in claim 13 wherein:

said permanent magnet poles individually have circumferential lengths that are limited by having more than 9 poles around the circumference.

16. A brushless electrical machine as described in claim 13 wherein:

a liner ring is placed over said permanent magnet poles and then said liner is interference fit inside of said lip.

17. A brushless electrical machine as described in claim 13 wherein:

said windings are wound such that active lengths that traverse radially and are located in said magnetic airgap have a smaller axial thickness than the end turns that traverse circumferentially and are located outside of said magnetic airgap.

* * * * *